UNITED STATES PATENT OFFICE.

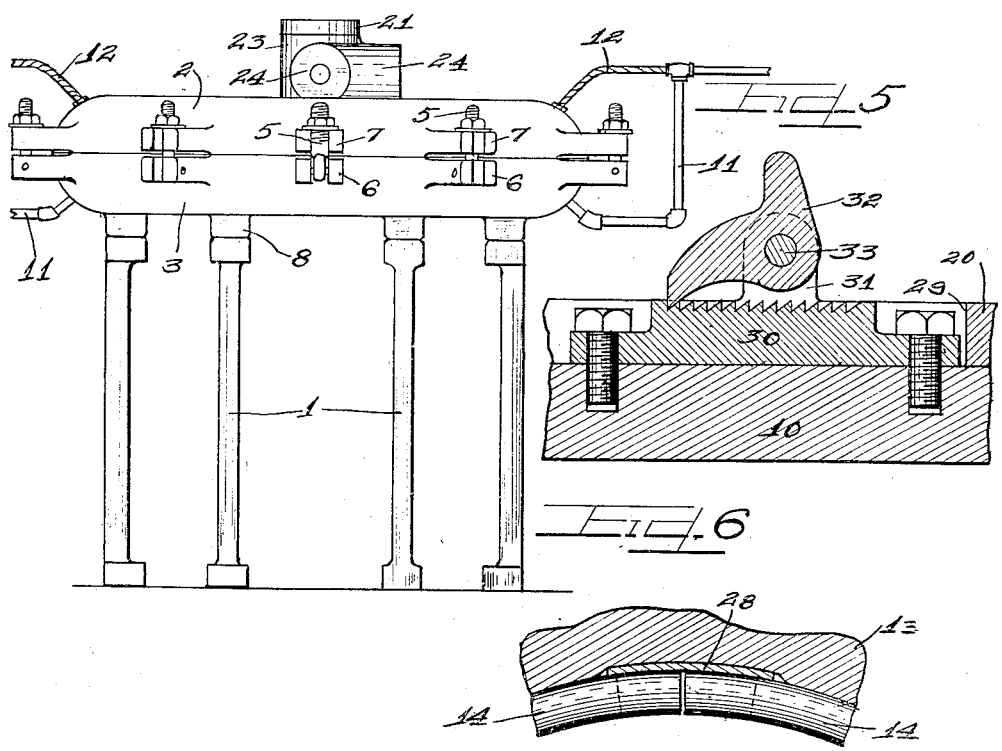

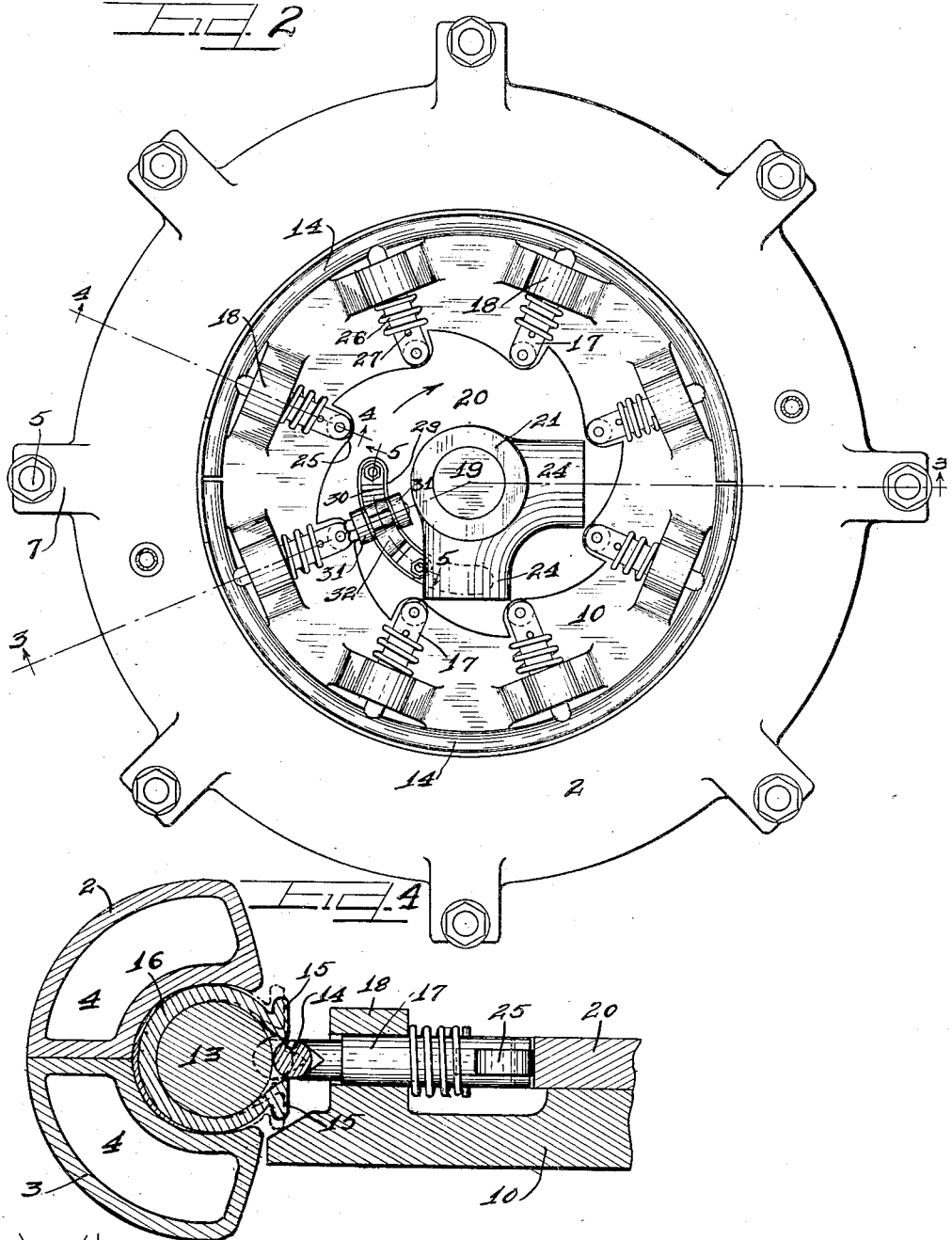

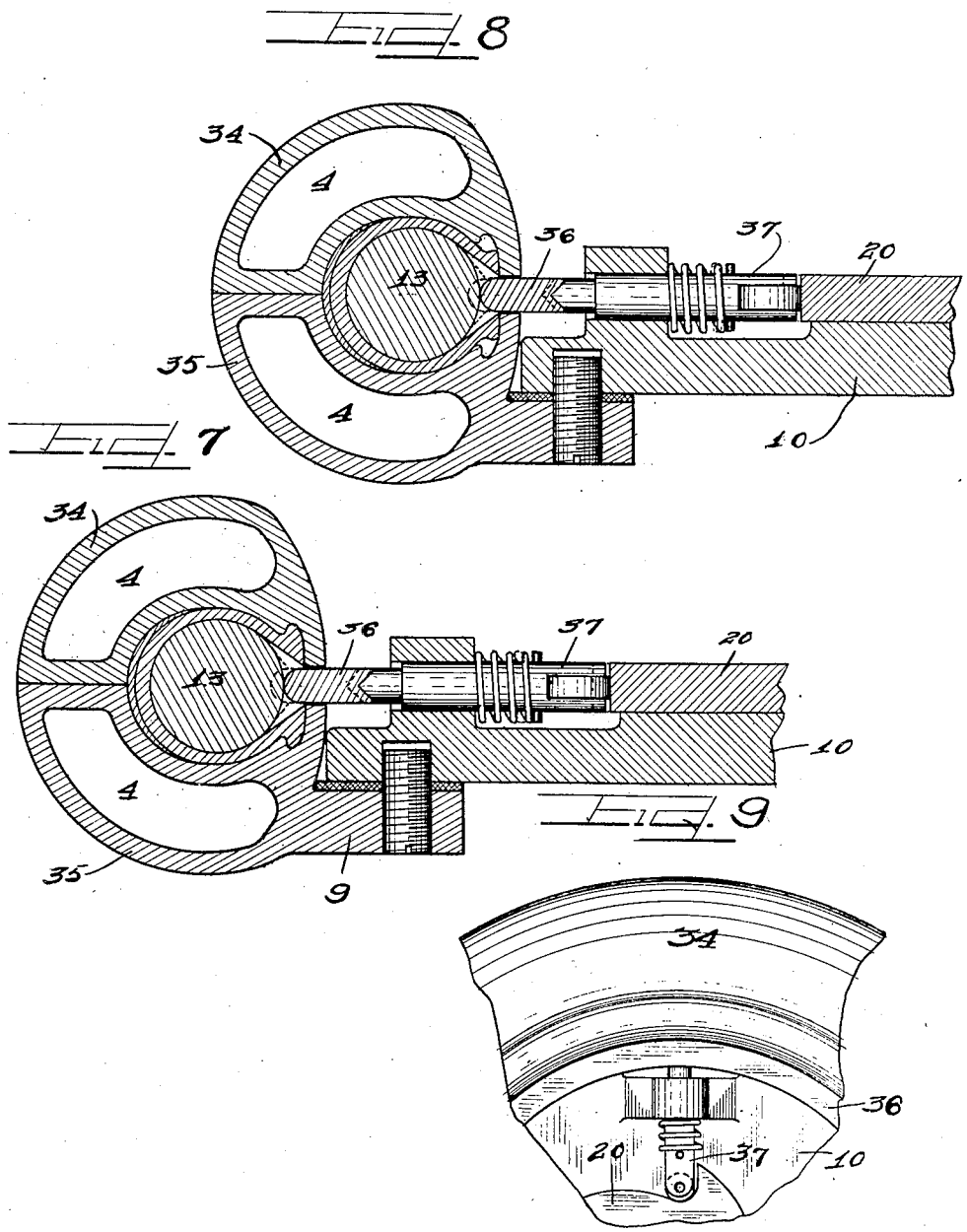

EMIL BORMAN, OF CHICAGO, ILLINOIS.

TIRE-REBUILDING DEVICE.

1,354,595.  Specification of Letters Patent.  Patented Oct. 5, 1920.

Application filed July 18, 1918. Serial No. 245,482.

*To all whom it may concern:*

Be it known that I, EMIL BORMAN, a citizen of the United States, and a resident of the city of Chicago, in the county of Cook and State of Illinois, have invented certain new and useful Improvements in Tire-Rebuilding Devices; and I do hereby declare that the following is a full, clear, and exact description of the same, reference being had to the accompanying drawings, and to the numerals of reference marked thereon, which form a part of this specification.

My invention has reference more particularly to a tire vulcanizing mold having means for holding the tire or portion thereof to be repaired under pressure in the mold during the process of vulcanizing.

The object of my invention is to provide means for holding a tire or portion thereof under pressure in a mold during the process of vulcanizing.

A further object of my invention is to provide a tire mold with a core of resilient material and means for expanding or packing the core in a tire placed within the mold so as to hold the tire or portion thereof to be repaired under pressure during the operation of vulcanizing.

Another object of my invention is to provide a tire mold with a core of resilient material adapted to be placed in a tire within the mold and means for uniformly expanding or packing the core at all points within the tire so as to hold the tire firmly against the vulcanizing mold.

Another object of my invention is to provide a tire mold with means for pressing the tire against the mold during the operation of vulcanizing, said means being adapted to apply pressure by means of a ratchet controlled cam whereby a powerful pressure may be exerted and the parts held to maintain such pressure during the vulcanizing.

Another object of my invention is to provide a tire mold with a resilient core adapted to be placed in the tire in the mold and an expansible ring having a plurality of plungers coöperating therewith so as to uniformly expand the ring against the core and press the tire firmly against the mold during the operation of vulcanizing.

My invention also has other and further important objects which will appear from the following specification and accompanying drawings, in which I have described and shown my invention in a preferred form.

On the drawings:

Figure 1 is a side view of a tire repairing device embodying my improvements.

Fig. 2 is an enlarged top view thereof.

Fig. 3 is a sectional view on the line 3—3 of Fig. 2.

Fig. 4 is an enlarged sectional view on the line 4—4 of Fig. 2.

Fig. 5 is an enlarged sectional view on the line 5—5 of Fig. 2.

Fig. 6 is a horizontal fragmentary sectional view showing the plate employed to bridge the gap between the ends of the pressure ring sections.

Fig. 7 is a view similar to Fig. 4, showing a modified form of mold and pressure ring.

Fig. 8 is a view similar to Fig. 7, showing the device used for repairing a different form of tire than that shown in Fig. 7.

Fig. 9 is a fragmentary top view of the pressure mechanism shown in Figs. 7 and 8.

As shown on the drawings:

The reference numeral 1, indicates a plurality of legs or standards upon which the tire mold is mounted, said mold comprising the upper and lower half sections 2 and 3, each of which is chambered as at 4 to afford a steam chamber, or may be otherwise heated for vulcanizing or repairing the tire. These half sections 2 and 3, are separable to permit the tire to be repaired to be placed therebetween and are clamped together by means of the bolts 5, which are pivoted to the lugs 6, on the lower section and adapted to be clamped over lugs 7, on the upper section, the said sections being grooved so that when clamped together a mold is formed thereby of the size and contour of the tire to be repaired. The lower section has downwardly projecting bosses 8, to which the standards 1, are secured and also has a plurality of inwardly extending lugs 9, which support the plate 10, which carries the mechanism for pressing the tire to be repaired into the mold formed by half sections 2 and 3. Steam may be supplied to the lower half section 3, through the pipes 11, and from the pipes 11, to the upper section 2, by means of flexible tubes or hose 12, so that the upper section 2, may be elevated above the stationary section 3.

For applying pressure to the interior of the tire to force same against the mold, I provide a core 13, of resilient material, and of substantially the same dimensions as the interior of the tire, which is placed therein, before the tire is placed in the mold, and mechanism is mounted on the plate 10, and for expanding or packing the core 13, in the tire so as to force same firmly against the mold.

This mechanism comprises a pair of ring segments 14, of suitable size to fit against the inside of the core 13, between the flanges 15, of the tire 16, when the latter is placed in the mold, and there are a plurality of plungers 17, mounted to slide radially in bearings 18, on the plate 10, and having the outer ends thereof notched so as to engage the inside of the ring sections 14, and hold same in the proper positions to press against the core 13. A stem 19, extends upwardly at the center of plate 10, and the cam toothed wheel 20, has the hub 23, thereof, journaled on the stem and held thereon by means of the collar 21, which is secured to the upper end of the stem 19, by means of the set screw 22, and the said hub 23, has a plurality of radially extending sockets 24, adapted to have a bar inserted therein for the purpose of rotating the cam toothed wheel 20.

The wheel 20, has a cam tooth to engage each of the plungers 17, and each of these plungers has a roller 25, at the inner end engaging with the surface of the cam tooth which latter in the position shown in Fig. 2, permits the plunger 17, to be retracted by means of the spring 26, with which each of the plungers is provided and which is compressed between the bearing 18, thereof, and a pin 27, with which the plunger is provided, and the said cam wheel 20, when rotated forces each of the plungers 17, outwardly an equal amount thereby forcing the ring sections 14, outwardly, against the inner surface of the core 13, so as to expand and pack same firmly inside the tire 16, and force the tire 16, against the inner wall of the mold. The adjoining ends of the sections 14, of the pressure ring overlap a plate 28, as shown in Fig. 6, which latter is placed against the core 13, and bridges the gap between the ends of the sections 14, of the ring.

In order to hold the cam wheel 20, in position with the plungers 17, forced outwardly, said wheel is provided with an arcuate slot 29, and the plate 10, with an arcuate rack 30, which is secured thereto and extends upwardly through the arcuate slot 29, said slot being sufficiently long to permit the required movement of the cam wheel 20. A lug 31, projects upwardly at each side of the arcuate slot 29, and has the ratchet pawl 32, pivotally mounted on the pin 33, carried by the said lugs 31 and engaging the rack 30, so that as the cam wheel 20, is rotated the pawl 32, engages the rack 30, to hold the cam wheel in the adjusted position.

In Fig. 7, I have shown a modified form of my invention, in which the half sections 34 and 35, are formed to almost completely embrace the tire, including the bead thereof, the inner edges of the sections being spaced apart sufficiently to hold the flat pressure bar 36, therebetween which is adapted to be pressed outwardly by means of plungers 37, similar to those of the previous structure to expand and pack the core 13, tight in the tire and the tire firmly against the mold. The outer ends of the plungers 37, instead of being notched as in the preceding structure may be tapered as shown so as to fit or engage in a V-shaped channel formed in the inner edge of the pressure bar 36, as shown in Fig. 7, which said pressure bar is made in sections similar to that of the previously described structure so that it may be pressed outwardly against the core 13. The structure shown in Fig. 7, is particularly adaptable for use when a new outer covering is to be applied to the tire, including the bead thereof and in this structure the mold is arranged to fit the bead as well as the entire outer surface of the tire so that the new covering may be pressed thereagainst and vulcanized onto the tire.

The structure shown in Figs. 1 to 6, inclusive is adapted for use in rebuilding the tread and sides of the tire regardless of the bead with which a clencher tire is provided, or a straight sided tire, whereas the device shown in Figs. 7 and 8, is adapted to be employed to recover or rebuild the entire outer surface of a clencher tire including the bead. The use of the structure shown in Fig. 7, however, is not restricted to repairing a tire having the particular bead but may be used as shown in Fig. 8, wherein a straight side tire is shown in a mold having a clencher bead recess.

The operation is as follows:

The device may be used for entirely retreading or recovering a worn tire or rebuilding a portion thereof, and in either case the portion to be repaired has sufficient of the original covering removed and prepared so that the new section or covering will adhere thereto, and sections of prepared rubber are cemented on the surface of the tire to be repaired or if the tire is to be entirely rebuilt or recovered an entire new tread of fabricated covering is cemented to the outer surface of the tire as usual, after which the core 13 is placed therein, and the tire and core clamped between the half sections of the mold.

The pressure ring sections are then placed in engagement with the outer ends of the plungers and against the inner face of the core 13, and the ratchet pawl 32, set to engage with the rack 30. A bar is then inserted in one of the sockets 24, with which the hub of the cam wheel 20, is provided and said cam wheel is rotated to force the plungers 17, outwardly which operation likewise forces the ring sections 14, outwardly, and packs the core 13, tight within the tire 16, and forces the tire firmly against the mold after which the steam or other heating means is applied thereto and the new material thus vulcanized in place.

While I have shown and described my invention in a preferred form, I am aware that various changes and modifications may be made therein without departing from the principles of my invention and I therefore do not purpose limiting the patent granted otherwise than necessitated by the prior art.

I claim as my invention:

1. In a tire apparatus, the combination of a circular tire mold, means for heating same, radially expansible means for holding a tire under pressure against the mold, and a ratchet for holding the said expansible means in the expanded position.

2. In a device of the class described, the combination of a circular tire mold, means for heating same, a central support having radially expansible means therein for pressing the tire against the mold, a rotary member on the support for operating the radially expansible means and locking means to hold the said expansible means in the expanded position.

In testimony whereof I have hereunto subscribed my name in the presence of two subscribing witnesses.

EMIL BORMAN.

Witnesses:
CHARLES W. HILLS, Jr.,
EARL M. HARDINE.